US009669591B2

(12) United States Patent
Koehn et al.

(10) Patent No.: US 9,669,591 B2
(45) Date of Patent: Jun. 6, 2017

(54) HEAT SEALABLE FILM WITH LINEAR TEAR PROPERTIES

(71) Applicant: TORAY PLASTICS (AMERICA), INC., N. Kingstown, RI (US)

(72) Inventors: Harold Egon Koehn, North Kingstown, RI (US); Matthew H. Brown, Wakefield, RI (US)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 363 days.

(21) Appl. No.: 14/076,951

(22) Filed: Nov. 11, 2013

(65) Prior Publication Data

US 2014/0065382 A1 Mar. 6, 2014

Related U.S. Application Data

(63) Continuation-in-part of application No. 13/193,095, filed on Jul. 28, 2011, now Pat. No. 8,932,725.

(60) Provisional application No. 61/368,796, filed on Jul. 29, 2010.

(51) Int. Cl.
| | |
|---|---|
| *B32B 27/08* | (2006.01) |
| *B32B 27/20* | (2006.01) |
| *B32B 27/32* | (2006.01) |
| *C08L 23/16* | (2006.01) |
| *C08L 23/06* | (2006.01) |
| *C08K 3/36* | (2006.01) |
| *C08K 3/34* | (2006.01) |
| *B29D 7/01* | (2006.01) |
| *C09J 7/02* | (2006.01) |
| *B29C 47/06* | (2006.01) |
| *C08L 23/14* | (2006.01) |
| *B29C 47/00* | (2006.01) |
| *B29K 23/00* | (2006.01) |

(52) U.S. Cl.
CPC ............ *B29D 7/01* (2013.01); *B29C 47/0021* (2013.01); *B29C 47/065* (2013.01); *B32B 27/08* (2013.01); *B32B 27/20* (2013.01); *B32B 27/32* (2013.01); *C08L 23/06* (2013.01); *C08L 23/142* (2013.01); *C08L 23/16* (2013.01); *C09J 7/0203* (2013.01); *B29C 47/0004* (2013.01); *B29K 2023/0633* (2013.01); *B29K 2023/12* (2013.01); *B32B 2255/10* (2013.01); *B32B 2255/205* (2013.01); *B32B 2264/102* (2013.01); *B32B 2270/00* (2013.01); *B32B 2307/31* (2013.01); *B32B 2307/516* (2013.01); *B32B 2307/558* (2013.01); *B32B 2307/7242* (2013.01); *B32B 2307/734* (2013.01); *B32B 2307/736* (2013.01); *B32B 2439/00* (2013.01); *B32B 2439/70* (2013.01); *C08K 3/34* (2013.01); *C08K 3/36* (2013.01); *Y10T 428/24843* (2015.01); *Y10T 428/2804* (2015.01); *Y10T 428/2826* (2015.01)

(58) Field of Classification Search
None
See application file for complete search history.

(56) References Cited

U.S. PATENT DOCUMENTS

| | | | |
|---|---|---|---|
| 4,207,363 A * | 6/1980 | Lustig | B32B 27/32 426/129 |
| RE30,726 E | 9/1981 | Otten et al. | |
| 4,291,085 A | 9/1981 | Ito et al. | |
| 4,308,084 A | 12/1981 | Ohtusuki et al. | |
| 4,464,438 A | 8/1984 | Lu | |
| 4,781,294 A | 11/1988 | Croce | |
| 4,834,245 A | 5/1989 | Ohga et al. | |
| 4,903,841 A | 2/1990 | Ohsima et al. | |
| 5,153,074 A | 10/1992 | Migliorini | |
| 5,443,765 A | 8/1995 | Yoshimura et al. | |
| 5,491,023 A | 2/1996 | Tsai et al. | |
| 5,527,608 A | 6/1996 | Kemp-Patchett et al. | |
| 5,786,050 A | 7/1998 | Otsuka et al. | |
| 6,110,549 A | 8/2000 | Hamada et al. | |
| 6,248,442 B1 | 6/2001 | Kong et al. | |
| 6,495,266 B1 | 12/2002 | Migliorini | |
| 6,541,086 B2 | 4/2003 | Moteki et al. | |
| 6,601,370 B2 | 8/2003 | Colombo et al. | |
| 6,719,678 B1 | 4/2004 | Stern | |

(Continued)

FOREIGN PATENT DOCUMENTS

| | | |
|---|---|---|
| EP | 1 803 772 | 7/2007 |
| EP | 1 849 826 | 10/2007 |

(Continued)

OTHER PUBLICATIONS

Koehn et al., U.S. Office Action mailed Oct. 16, 2014, directed to U.S. Appl. No. 13/193,095; 6 pages.
Paolilli et al., U.S. Office Action mailed Oct. 16, 2014, directed to U.S. Appl. No. 13/222,709; 6 pages.
Koehn et al., U.S. Office Action mailed Apr. 21, 2014, directed to U.S. Appl. No. 13/193,095; 9 pages.

(Continued)

*Primary Examiner* — Sheeba Ahmed
(74) *Attorney, Agent, or Firm* — Morrison & Foerster LLP

(57) ABSTRACT

A monoaxially oriented film including an ethylene-propylene copolymer elastomer, a non-elastomeric propylene-based random copolymer, and a low density polyethylene, which is oriented at least about 2.5 times in one direction and exhibits excellent linear directional tear properties parallel to the orientation direction, excellent heat seal performance in terms of high heat seal strengths and low seal initiation temperature, and is less than 50 μm in thickness after orientation. This "thin" film formulation and orientation is suitable for pouch applications requiring an "easy-tear" linear tear feature and excellent hermetic seal properties.

22 Claims, No Drawings

(56) References Cited

U.S. PATENT DOCUMENTS

| | | | |
|---|---|---|---|
| 6,773,818 B2 * | 8/2004 | Cretekos | B32B 27/32 |
| | | | 428/461 |
| 6,939,919 B2 | 9/2005 | Tau et al. | |
| 8,431,234 B2 | 4/2013 | Koehn et al. | |
| 8,932,725 B2 * | 1/2015 | Koehn | B29C 47/065 |
| | | | 428/323 |
| 8,932,726 B2 * | 1/2015 | Paolilli | B29C 47/0004 |
| | | | 428/457 |
| 2004/0072004 A1 | 4/2004 | Migliorini et al. | |
| 2006/0257652 A1 | 11/2006 | Su | |
| 2008/0051518 A1 | 2/2008 | Sakamoto | |
| 2008/0101733 A1 | 5/2008 | Fenn-Barrabass et al. | |
| 2008/0292225 A1 | 11/2008 | Dayrit et al. | |
| 2010/0040875 A1 | 2/2010 | Patel et al. | |
| 2010/0055429 A1 | 3/2010 | Lee et al. | |

FOREIGN PATENT DOCUMENTS

| | | |
|---|---|---|
| JP | 63-132050 | 6/1988 |
| JP | 11-509575 | 8/1999 |
| JP | 2002-003619 | 1/2002 |
| JP | 2002-347192 | 12/2002 |
| WO | WO 97/42258 | 11/1997 |
| WO | WO-99/23139 | 5/1999 |
| WO | WO-2010/019943 | 2/2010 |
| WO | WO-2010/047906 | 4/2010 |

OTHER PUBLICATIONS

Paolilli et al., U.S. Office Action mailed Apr. 18, 2014, directed to U.S. Appl. No. 13/222,709; 11 pages.

Extended European Search Report dated Apr. 17, 2014, directed to EP Application No. 11813205.9; 6 pages.

Canadian Office Action dated Jul. 14, 2014, directed to CA Application No. 2,803,285; 7 pages.

Mexican Office Action dated Jun. 23, 2015, directed to MX Application No. Mx/a/2013/001192; 2 pages.

International Search Report and Written Opinion mailed Dec. 16, 2011, directed to International Application No. PCT/US11/45771; 8 pages.

International Search Report and Written Opinion mailed Oct. 16, 2012, directed to International Application No. PCT/US11/50028; 8 pages.

Koehn et al., U.S. Office Action mailed Aug. 8, 2013, directed to U.S. Appl. No. 13/193,095; 8 pages.

Paolilli et al., U.S. Office Action mailed Aug. 9, 2013, directed to U.S. Appl. No. 13/222,709; 9 pages.

Canadian Office Action dated Oct. 23, 2013, directed to CA Application No. 2,803,285; 3 pages.

Paolilli et al., U.S. Office Action mailed Jan. 13, 2016, directed to U.S. Appl. No. 14/484,849; 9 pages.

Notice of Reasons for Rejection mailed Feb. 24, 2015, directed to JP Application No. 2013-521985; 8 pages.

* cited by examiner

HEAT SEALABLE FILM WITH LINEAR TEAR PROPERTIES

CROSS-REFERENCE TO RELATED APPLICATION

This application is a continuation-in-part application of U.S. application Ser. No. 13/193,095, filed Jul. 28, 2011, which claims the benefit of U.S. Provisional Application Ser. No. 61/368,796, filed Jul. 29, 2010, the contents of which are incorporated herein by reference.

FIELD OF THE INVENTION

This invention relates to a mono-oriented film that possesses linear tear properties. The films include a blend of an incompatible polymer such as low density polyethylene (LDPE) with propylene-based random copolymers and/or terpolymers. The films, when mono-oriented, display the tendency to fibrillate.

BACKGROUND OF THE INVENTION

Polymer films are commonly utilized to produce containers, such as pouches, that are used to contain, transport, and preserve a variety of substances, including but not limited to, foods. These containers are commonly created using a heat sealing process, in which high pressure and temperature is applied to opposing polymer films or laminates to join them together. Through this sealing process, the shelf life of the packaged material is extended through the prevention of contamination of the substance from such processes as microbial contamination or an influx of gases such as oxygen (which can cause rancidity of some packaged food products via oxidation of fats and oils) or water vapor (which can cause staleness of some packaged food products via moisture retention or loss). The temperature at which this seal is created can be relatively high depending on the melting or softening point of the polymer material used as a sealant. The seal initiation temperature (SIT) of the sealant material can be important to commercial packagers since it will influence the operating conditions (e.g. temperature set points) of the packaging machine as well as packaging speeds due to thermal transfer/residence time for the heat from the sealer jaws to soften and fuse the package's sealant material. In general, a lower SIT is desirable as it can allow lower temperature settings for the heated jaw sealers of the packaging machine. By reducing this seal initiation temperature, the process can be made to be faster, more economical, use less electricity, and be more efficient. In addition, lower sealing temperatures may reduce the risk of thermal deformation or distortion of the packaging material, resulting in more attractive pouch appearance on the store shelf.

A typical packaging pouch is a laminate of several films, typically constructed of: A film that can be printed for the marketing of the food product; a barrier film to inhibit the diffusion of oxygen and moisture and thus prolong the shelf-life of the product; and a sealant film which provides hermetic seals that also help prevent ingress of gases or microbes that could shorten the shelf-life of the product or cause spoilage. In some cases, the barrier film and the sealant film can be combined into a single film that provides both functions of gas barrier as well as sealability. Typically, this sealant film is a non-oriented, cast polypropylene or polyethylene-based film. The polyethylene film can also be made via blown film processes well-known in the art.

The high seal strengths required for some pouch packaging also make it difficult for the consumer to open the pouch by hand, especially if the retort package is made of all-polymeric films. Scissors or sharp implements must typically be used to open such pouches. To make the pouches more user-friendly, notches can be used to enable the consumer to easily initiate a tear and thus open the pouch. However, such a tear can easily result in "zippering" of the pouch whereby the tear is not uniformly parallel to the top edge of the pouch but can become vertical or diagonal to the top of the pouch and cause a potential loss or spillage of the contents during opening. To rectify this, some solutions involve perforating a tear-line with the notch in order to keep the tear directionally parallel to the top of the pouch and thus prevent zippering. These perforations are often accomplished using mechanical perforators or lasers. Some concerns using perforation techniques are not only additional cost, but also the potential compromising of barrier properties since these techniques are essentially making physical holes in the pouch laminate.

Another method to impart directional tear properties could be to orient the cast polypropylene film typically used in pouch applications. However, the process of orienting such a film—either uniaxially or biaxially—typically diminishes the seal properties in that the seal initiation temperature (SIT) of the film is raised and the overall seal strengths are weaker. Without being bound by any theory, this is believed to be due to the fact that the orientation process aligns the amorphous regions into a more ordered configuration, raising the Tg of the film, and thus, resulting in poorer seal properties. This is why unoriented cast polypropylene works well as a sealant film versus, for example, biaxially oriented polypropylene film (BOPP) which generally functions poorly as a sealant film. (This is assuming that no coextruded highly amorphous/low crystallinity random copolymer heat sealable resins are used as part of the BOPP film.) There is typically a minimum and maximum range for uni-axial orientation stretching in the machine direction (MDX): under 2.0 MDX, the film usually suffers from uneven stretching mark defects and over 7.0 MDX, processing stability can be difficult to maintain, as the film may be prone to breakage at this high orientation rate.

Although crystalline propylene homopolymer and blends of crystalline propylene homopolymer with ethylene-propylene copolymers will display acceptable linear tear properties when oriented sufficiently in one direction, the higher content comonomer polypropylenes generally do not show acceptable linear tear properties by themselves. The reason for the use of copolymer and terpolymers is to get acceptably low seal initiation temperatures. Low seal initiation temperatures allow for faster sealing speeds and use of certain lamination films that may melt or deform if too high a sealing temperature is used. Sealing films made with crystalline propylene homopolymers as a component of the film, however, often show a higher-than-desired SIT and adjustments to raise sealer jaw temperature settings and/or to lower packaging machine linespeeds to accommodate such homopolymer-containing sealing films are often needed. Although such homopolymer-containing films can demonstrate excellent directional or linear tear properties with an amount of mono-orientation, SIT is often higher than desired. As a result, food packagers must raise their packaging equipment's sealing temperatures to higher set-points or lower packaging bag speeds in order to get acceptable seal strengths. This can be undesirable as it may result in productivity losses and higher costs. Although propylene copolymers can demonstrate excellent SIT, they often fail to exhibit satisfactory directional or linear tear properties when mono-oriented. Thus, it is desirable to provide to the packaging industry a heat sealable film that has low SIT, fit-for-use seal strengths, and also directional tear properties without using techniques such as perforation or expensive specialized films for such tear properties.

U.S. application Ser. No. 12/542,385 describes a linear or directional tear retortable sealant film using blends of metallocene-catalyzed propylene-butene elastomers and ethylene-propylene impact copolymers which are monoaxially oriented at least 4 times in the machine direction. Typical seal initiation temperatures reported are about 320° F. (160° C.) or higher. This reference is incorporated herein in its entirety.

U.S. Pat. RE30,726 describes a film including blended low density polyethylene and ionomer resins which is blow-extruded to form a film with linear tear properties in the direction of the extrusion.

U.S. Pat. No. 4,781,294 describes a tear-oriented package with one wall formed from foamed polypropylene and another from tear resistant polyester film or another such substance. However, zones of weakening, such as perforations, are used to provide easy opening of the packaging.

U.S. Pat. No. 6,248,442 describes the use of a multilayered film that includes a layer of LLDPE which is biaxially oriented through the process of machine direction orientation. This produces a bag which can be torn unidirectionally and which contains a resealable zipper.

U.S. Pat. No. 6,601,370 describes a process for forming a reclosable film package with a straight tear by attaching a nylon or polyester layer to a sealant layer, such as polyethylene. This involves two layers of overlapping films which propagate a tear along a linear path when sufficient force is applied.

U.S. Pat. No. 6,939,919 describes a blend of polypropylene and polyethylene with enhanced properties, of which a majority is polyethylene with a minority of the blend being polypropylene. However, this patent does not cite any linear tear properties of the resultant blend.

U.S. Pat. No. 6,541,086 describes a retort package design using an oriented polymer outer film (suitable for printing), an aluminum foil as a barrier film, a second oriented intermediate polymeric film, and a non-oriented polyolefin for the sealant film. Easy-tear functionality is added by surface-roughening the two oriented polymer films and overlapping them in a particular formation. The particular specific order of laminating the films and the surface-roughening by sandpaper provides for easy-tear properties and presumably directional tear, but this process involves additional films and extra steps to accomplish the desired tear properties.

U.S. Pat. No. 6,719,678 B1 describes a retort package design using multiple film layers whereby the intermediate layers ("burst resistant layer") are scored by a laser such that the score lines provide an easy-tear feature and a directional tear feature.

U.S. Pat. No. 4,903,841 describes a retort package design that utilizes non-oriented cast polypropylene films as the sealable layer, which is surface-roughened or scored in a particular manner so as to impart directional tear properties.

U.S. Pat. No. 4,291,085 describes a retort package design using a non-drawn, non-oriented cast crystalline polypropylene film as the sealable layer with specific crystalline structure and orientation of the crystalline structures which must be less than 3.0. There are no directional tear properties cited.

U.S. Pat. No. 5,786,050 describes an "easy opening" pouch design which has as the inner ply (which contacts the pouch's contents) a sealant film including linear low density polyethylene; an intermediate layer composed of an oriented polyolefin with an MD/TD ratio of greater than 2; and an outermost layer of biaxially oriented PET or nylon film. The inner ply sealant of linear low density polyethylene is non-oriented. The specific orientation ratios of the intermediate film imparts easy-tear properties.

U.S. Pat. No. 4,834,245 describes a pouch design having a "tearing zone" using a monoaxially oriented film with a pair of notches aligned with the tearing direction and the direction of orientation of the film. The monoaxially oriented film that imparts the "tearing zone" is on the outside of the pouch and does not contact the pouch contents and is not designed or considered to be appropriate for heat-sealability.

U.S. patent application Ser. No. 11/596,776 describes a pouch design including at least one uni-directionally stretched film. The preferred embodiments describe a uni-directionally stretched polypropylene film or uni-directionally stretched polyethylene terephthalate film which imparts the easy-tear property. The application is silent as to the sealing properties of these layers or even which layer should be the sealant film.

SUMMARY OF THE INVENTION

The above issues of making a heat sealable film with excellent sealing characteristics such as a low seal initiation temperature with excellent linear tear properties without using mechanical or laser perforation schemes or surface roughening and/or scoring methods are addressed. The inventors have found a blend that balances these attributes for linear tear with a low seal initiation temperature. The linear tear property and low SIT is enhanced via the addition of about 3 to 65 wt % of low density polyethylene (LDPE) with about 97 to 35 wt % of a propylene random copolymer. The LDPE has a degree of incompatibility with the propylene-based copolymers and, when oriented in one direction, this incompatible blend exhibits excellent linear tear properties. The directional tear property is imparted via machine direction (MD) orientation of the cast film from about 2.5 times to 7 times original length. This combination of MD orientation and resin formulation provides excellent directional tear properties without compromising the high seal strength and hermetic seal properties required for pouches.

There is also a need in the packaging industry for a low SIT, linear tear film that is thinner than 50 μm (200 G or 2.0 mil) and has a high yield (i.e. "yield" in this context means a film with a certain unit area per unit weight, such as "36 m²/kg" (or 25,500 in²/lb)) and thus, improved cost savings. However, in the production of mono-oriented polyolefin films—and particularly, polypropylene-based films—"thin" films below 50 μm have a tendency to break or tear easily, resulting in poor productivity, waste, and higher costs. Mono-oriented films thicker than 50 μm are much more stable during mono-axial orientation and are accomplished relatively easily. The inventors have found a formulation blend that enables a heat sealable film with excellent linear tear properties to be made at significantly thinner thicknesses of less than 50 μm (200 G), and preferably 25-37.5 μm (100-150 G or 1.0-1.5 mil).

One embodiment is a monoaxially oriented film including a single layer (A) of a propylene random copolymer blended with an amount of low density polyethylene homopolymer (LDPE). This layer (A) formulation is suitable for heat sealable applications, particularly for packaging applications. Another embodiment could include a laminate film in which a second polyolefin resin-containing layer (B) could be coextruded on one side of the layer (A). This second polyolefin resin-containing layer could be considered a core or base layer to provide the bulk strength of the laminate film. Preferably, this core layer (B) could also include an ethylene-propylene copolymer or impact copolymer. Furthermore, in another embodiment, the laminate could further include a third polyolefin resin-containing layer (C) on the second polyolefin resin-containing core layer (B) opposite the side with the heat sealable layer (A).

Preferably, the heat sealable layer (A) includes a majority component of a propylene random copolymer. The propylene-based random copolymer may be a copolymer of propylene with ethylene, butene, or combinations of both (i.e. ethylene-propylene-butene copolymer). The propylene-based random copolymer may be catalyzed via Zieglar-Natta or by metallocene processes. The propylene-based random copolymer may be a higher molecular weight copolymer (e.g. ca. 350,000 $M_w$ or higher) or a lower molecular weight one such as an elastomer or plastomer (e.g. less than 350,000 $M_w$ or about 5000-100,000 $M_w$). The other component of this blend is the addition of an amount of low density polyethylene. Typically, the LDPE is a minority component, including about 3-30 wt % of the layer (A), but it can include up to 65 wt % of the layer (A).

This heat sealable propylene copolymer/LDPE resin-containing layer (A) can also optionally include an antiblock component selected from the group consisting of amorphous silicas, aluminosilicates, sodium calcium aluminum silicates, glass microspheres, talcs, micas, minerals, crosslinked silicone polymers, and polymethylmethacrylates to aid in machinability and winding. It can also be contemplated to discharge-treat one side of the layer (A) in order to enhance that side for laminating via adhesives, etc. Discharge-treating can be done by any of several means well known in the art, such as corona, flame, plasma, or discharge-treatment in a controlled atmosphere of selected gases.

This film layer (A) is then monoaxially oriented from about 2.5-7 times in the machine direction, preferably 3-7 times, and more preferably 4.0 to 6.0 times. This monoaxial orientation imparts a directional tear property to the film. The resin formulation of the (A)-layer provides excellent seal initiation, seal strengths, and hermetic seal properties after monoaxial orientation, suitable for many pouch applications.

In the embodiment of a 2-layer laminate film structure, the (A)-layer could include a sealant layer on one side of a core layer (B). Preferably, this core layer (B) includes a polyolefin resin-containing layer which in turn, includes a propylene homopolymer or propylene copolymer. More preferable is an ethylene-propylene copolymer or impact copolymer. The (A)-layer can be the same thickness as the (B) core layer, but preferably is thinner than the (B)-layer, about 5-50% of the total thickness of the (A) and (B) layers combined, more preferably 10-30% of the total thickness of the laminate film structure (A) and (B) layers combined. This core polyolefin resin-containing layer can also include an antiblock component selected from the group consisting of amorphous silicas, aluminosilicates, sodium calcium aluminum silicates, glass microspheres, talcs, micas, minerals, crosslinked silicone polymers, and polymethylmethacrylates to aid in machinability and winding. It can also be contemplated to discharge-treat the side of the core layer (B) opposite the heat sealable layer (A) in order to enhance that side for laminating via adhesives, etc. Discharge-treating can be done by any of several means well known in the art, such as corona, flame, plasma, or discharge-treatment in a controlled atmosphere of selected gases.

In the embodiment of a 3-layer laminate film structure, a third layer (C) could be disposed on the side of the core layer (B) opposite the heat sealable layer (A) and preferably includes a polyolefin resin-containing layer which in turn, includes a polyolefin selected from the group consisting of propylene homopolymer, copolymers, terpolymers, polyethylene, maleic anhydride-grafted polyolefins, and combinations thereof. This third polyolefin resin-containing layer can also include an antiblock component selected from the group consisting of amorphous silicas, aluminosilicates, sodium calcium aluminum silicates, glass microspheres, talcs, micas, minerals, crosslinked silicone polymers, and polymethylmethacrylates to aid in machinability and winding. The third polyolefin layer can also be a discharge-treated layer having a surface for lamination, metallizing, printing, or coating with adhesives or inks as described previously.

In the case of a film structure including only one layer, such as the heat sealable layer (A), as mentioned previously, it can be contemplated to discharge-treat one side of this layer for lamination, metallizing, printing, or coating, while leaving the opposite side untreated in order to maintain heat sealable properties. Discharge-treating this layer can result in the treated side having a narrower seal range due to crosslinking of the ethylene and/or butene constituents of the blend. Thus, at least one side should be left untreated in order to obtain the full and useful heat seal range. In the case of a 2-layer (or more) laminate structure wherein the sealable layer (A) is contiguous with a polyolefin core layer (B), it is preferable to discharge-treat the side of the core layer opposite the sealable layer (A) for purposes of laminating, printing, metallizing, coating, etc.

Discharge-treatment in the above embodiments can be accomplished by several means, including but not limited to corona, flame, plasma, or corona in a controlled atmosphere of selected gases. Preferably, in one variation, the discharge-treated surface has a corona discharge-treated surface formed in an atmosphere of $CO_2$ and $N_2$ to the exclusion of $O_2$. The laminate film embodiments could further include a vacuum-deposited metal layer on the discharge-treated layer's surface. Preferably, the metal layer has a thickness of about 5 to 100 nm, has an optical density of about 1.5 to 5.0, and includes aluminum. In one variation, the laminate film is an extruded laminate film.

In yet another embodiment, this invention provides monoaxially oriented polyolefin films with a heat sealable layer of blends of propylene random copolymers, elastomers, and plastomers with low density polyethylene to enhance heat sealing properties for flexible packaging purposes. An additional embodiment provides laminate structures of the heat sealable polyolefin blend layers for heat sealable applications in flexible packaging.

Preferably, the monoaxially oriented film is produced via extrusion of the heat sealable layer blend through a die whereupon the molten film layer is quenched upon a chilled casting roll system or casting roll and water bath system and subsequently oriented in the machine direction and annealed or heat-set to minimize thermal shrinkage into a thermally, dimensionally stable film.

In the embodiments of a multi-layer film, the laminate film is produced via coextrusion of the heat sealable layer blend and the core layer and/or other layers through a compositing die whereupon the molten multilayer film structure is quenched upon a chilled casting roll system or casting roll and water bath system and subsequently oriented in the machine direction and annealed or heat-set into a multi-layer film.

All these examples can also be metallized via vapor-deposition, preferably a vapor-deposited aluminum layer, with an optical density of at least about 1.5, preferably with an optical density of about 2.0 to 4.0, and even more preferably between 2.3 and 3.2. In the embodiments in which the invention is part of a multi-layer coextruded film, the metal receiving layer or surface may be specially formulated or discharge-treated to enhance metal deposition, metal nucleation, and metal adhesion properties.

This invention provides a method to improve the heat sealability of monoaxially oriented films resulting in an economical, highly sealable film with excellent directional tear properties suitable for packaging applications. The invention helps solve the problems associated with the prior art of directional tear polyolefin substrates in packaging applications. In addition, formulations that provide "thin" (less than 50 μm thickness after mono-axial orientation) heat sealable directional tear films comprising a blend of non-elastomeric propylene-ethylene random copolymer, propylene-ethylene copolymer elastomer or plastomer, and low density polyethylene, mono-axially oriented from 4.0-6.0 times in the machine direction, are disclosed.

In some embodiments, a "thin" monoaxially oriented polyolefin film includes: 40-60 wt % ethylene-propylene copolymer elastomer, 20-40 wt % non-elastomeric propylene-based copolymer, and 20-40 wt % low density ethylene homopolymer. The film is monoaxially at least 2.5 times in one direction, exhibits excellent linear directional tear characteristics in a direction parallel to the orientation direction, and is less than 50 μm in thickness after orientation.

The film may be heat sealable. In some embodiments, the film includes about 50 wt % ethylene-propylene copolymer elastomer, about 20 wt % non-elastomeric propylene-based copolymer, and about 30 wt % low density ethylene homopolymer. In some embodiments, the thickness of the film after orientation is 25 μm-37.5 μm. In some embodiments, the film is monoxially oriented 4.0-6.0 times. In some embodiments, the film is a single layer film.

In some embodiments, the film includes a slip additive or an antiblock additive. The antiblock may be amorphous silicas, aluminosilicates, sodium calcium aluminum silicates, glass microspheres, talcs, micas, minerals, crosslinked silicone polymers, or polymethylmethacrylates.

In some embodiments, a side of the film is discharge treated. In some embodiments, a side of the film, preferably a discharge treated side of the film includes a metal layer, an adhesive or extrusion laminated layer, a coated layer, or a printed layer.

In some embodiments, a method of making a "thin" monoaxially oriented film that exhibits excellent linear directional tear characteristics in a direction parallel to an orientation direction includes: extruding a film comprising 40-60 wt % ethylene-propylene copolymer elastomer, 20-40 wt % non-elastomeric propylene-based copolymer, and 20-40 wt % low density ethylene homopolymer; and monoaxially the film at least 2.5 times in one direction, wherein the film is less than 50 μm in thickness after orientation.

Additional advantages of this invention will become readily apparent to those skilled in the art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the examples and description are to be regarded as illustrative in nature and not as restrictive.

DETAILED DESCRIPTION OF THE INVENTION

Described are mono-oriented films that possess linear tear properties. The films include a blend of an incompatible polymer such as low density polyethylene (LDPE) with propylene-based random copolymers and/or terpolymers. The films, when mono-oriented, display the tendency to fibrillate. These properties, for example, facilitate a linear tear in a pouch made utilizing the films layer. Neither LDPE nor the higher modified polypropylene polymers will display the linear tear properties alone, even when mono-oriented. In addition, the described formulations enable the production of mono-oriented linear tear films that are significantly and unexpectedly thinner than films conventionally produced. These films have excellent sealing properties, linear tear properties, uniform appearance, clarity, and film profile flatness and consistency. Such films can be made that are less than 50 μm (200 G) in thickness.

When mono-oriented, homopolymer and impact propylene-based resins will display linear or directional tear properties without further modification. Described are formulations that provide a linear tear film with lower melting temperature polymers. This allows for a heat seal layer film with significantly lower seal initiation temperature that still retains linear tear properties.

In some embodiments, the films are well-suited as the sealable film component for certain pouch packaging applications, in particular, non-retortable pouches. In addition, the films are highly suitable for packages that require hand-tearability and can produce a tear line that is controlled and consistent across the top of the pouch and parallel to the top of the pouch, without causing "zippering" of the pouch and subsequent potential loss of the contents. This invention is novel in that it combines both excellent seal strengths and hermetic seals suitable for pouching and directional tear, obviating the need for perforation techniques to enable directional tear.

In one embodiment of the invention, the laminate film includes a single-layer mono-oriented extruded film of: A mixed polyolefin resin layer comprising a non-elastomeric propylene-based random copolymer; and/or an amount of ethylene-propylene copolymer elastomer or plastomer; and an amount of a low density ethylene homopolymer. Another embodiment of the inventive film comprises a similar formulation as above, except that one side of the mixed polyolefin resin layer is discharge-treated.

The mixed polyolefin resin layer is uniaxially oriented. The non-elastomeric propylene random copolymer can be an isotactic ethylene-propylene impact copolymer with an ethylene-propylene rubber content of about 10-30 wt % of the polymer wherein the ethylene content of the rubber is about 10-80 wt % of the rubber. Typically, the non-elastomeric propylene-based random copolymer is an ethylene-propylene copolymer, an ethylene-butene copolymer, a propylene-butene copolymer, or an ethylene-propylene-butene copolymer. Preferably, an ethylene-propylene or ethylene-propylene-butene copolymer is used. The copolymer could also include an elastomer or plastomer. A thermoplastic elastomer can be described as any of a family of polymers or polymer blends (e.g. plastic and rubber mixtures) that resemble elastomers in that they are highly resilient and can be repeatably stretched and, upon removal of stress, return to close to its original shape; is melt-processable at an elevated temperature (uncrosslinked); and does not exhibit significant creep properties. Thermoplastic elastomers typically have a density of between 0.860 and 0.890 g/cm$^3$ and a molecular weight $M_w$ of 100,000 or greater. Plastomers differ from elastomers: a plastomer can be defined as any of a family of ethylene-based copolymers (i.e. ethylene alpha-olefin copolymer) which has properties generally intermediate to those of thermoplastic materials and elastomeric materials (thus, the term "plastomer") with a density of less than about 0.900 g/cm$^3$ (down to about 0.865 g/cm$^3$) at a molecular weight $M_w$ between about 5000 and 50,000, typically about 20,000 to 30,000. Plastomers generally have an ethylene crystallinity between thermoplastics and ethylene alpha-olefin elastomers and are generally of a higher crystallinity than elastomers (which can generally be considered amorphous). As such, plastomers generally have better tensile properties than elastomers.

Such thermoplastic elastomers and plastomers are in contrast to typical conventional non-elastomeric or non-plastomeric ethylene-propylene or propylene-butene or ethylene-propylene-butene copolymers typically used for heat sealable resin layers (such as Sumitomo SPX78R1 or Total 8473 or Total Z9421) which are long-chain, high molecular weight polymers with significantly higher molecular weights on the order of 350,000 to 400,000 g/mol. These types of high molecular weight heat sealable copolymer resins are not considered thermoplastic elastomers as they do not contain rubbery portions or exhibit rubbery or elastomeric characteristics.

The film may also include blends of said higher-molecular weight copolymers, impact copolymers, plastomers, and/or elastomers and are used in various combinations with the low density polyethylene.

A suitable example of ethylene-propylene impact copolymer for is Total Petrochemical's 5571. This resin has a melt flow rate of about 7 g/10 minutes at 230° C., a melting point of about 160-165° C., a Vicat softening point of about 148° C., and a density of about 0.905 g/cm$^3$. Another example of ethylene-propylene impact copolymer can be Total Petrochemical's 4180 with a melt flow rate of about 0.7 g/10 minutes at 230° C., a melting point of about 160-165° C., a Vicat softening point of about 150° C., and a density of about 0.905 g/cm$^3$. Other suitable ethylene-propylene impact copolymers can be Sunoco Chemical's TI-4015-F with a melt flow rate of 1.6 g/10 minutes at 230° C. and a density of about 0.901 g/cm$^3$ and ExxonMobil Chemical's PP7033E2 with a melt flow rate of about 8 g/10 minutes at 230° C. and a density of about 0.9 g/cm$^3$.

Suitable examples of non-elastomeric propylene-based random copolymers are: Total Petrochemicals Z9421 ethylene-propylene random copolymer of about 5.0 g/10 min melt flow rate (MFR) at 230° C., melting point of about 120° C., density 0.89 g/cm$^3$, and ethylene content of about 7 wt % of the polymer; Total Petrochemicals 8473 ethylene-propylene random copolymer of about 4.0 MFR at 230° C. and ethylene content of about 4.5 wt % of the polymer; and Sumitomo Chemical SPX78R1 ethylene-propylene-butene random copolymer of about 9.5 g/10 min MFR at 230° C., ethylene content of about 1.5 wt %, and butene content of about 16 wt % of the polymer. Suitable examples of elastomeric propylene-based random copolymers are: Exxon-Mobil Chemical Vistamaxx™ ethylene-propylene random copolymer elastomers such as grade 3980 FL with an MFR of about 8.3 g/10 min at 230° C., Vicat softening point of about 80° C., melting point of about 79° C., density of about 0.879 g/cm$^3$, and ethylene content of about 8.5 wt %. Other suitable propylene-based elastomers may be contemplated including but not limited to: metallocene-catalyzed thermoplastic elastomers like ExxonMobil's Vistamaxx™ 3000 grade, which is an ethylene-propylene elastomer of about 11 wt % ethylene content, 8 g/10 min MFR at 230° C., density of 0.871 g/cm$^3$, $T_g$ of −20 to −30° C., and Vicat softening point of 64° C.; or ethylene-propylene alpha-olefin copolymer plastomers of Dow Chemical's Versify™ grades, such as grade 3300, which is an ethylene-propylene plastomer of about 12 wt % ethylene content, 8 g/10 min MFR at 230° C., density of 0.866 g/cm$^3$, $T_g$ of −28° C., and Vicat softening point of 29° C.

A suitable example of LDPE is ExxonMobil LD105.30 low density ethylene homopolymer resin of about 2.0 g/10 min melt flow index at 190° C., melting point about 111° C., and density of about 0.923 g/cm$^3$. Other grades of LDPE of similar properties can be used as well and the invention is not limited to only the grades described.

The LDPE is blended with the propylene-based random copolymer at about 3 to 65 wt % of the layer, preferably about 5-50 wt %, and more preferably about 10-40 wt %. A higher content of LDPE (e.g. 40-65 wt %) helps improve the inventive film's bonding to polyethylene-based zipper stocks commonly used in pouching applications; however, optical clarity may be worsened by the higher loadings. Optionally, whitening pigments can be added to the inventive film to produce a white sealant film, useful for certain aesthetic appearance to the pouch or package application. Whitening agents can include—but are not limited to—$TiO_2$, barium sulfates, optical brighteners, or calcium carbonates.

It can also be contemplated to add an optional amount of antiblocking agent to the mixed resin film layer for aiding machinability and winding. An amount of an inorganic antiblock agent can be added in the amount of 100-5,000 ppm of the heat sealable resin layer (A), preferably 500-1000 ppm. Preferred types of antiblock are spherical sodium aluminum calcium silicates or an amorphous silica of nominal 6 μm average particle diameter, but other suitable spherical inorganic antiblocks can be used including cross-linked silicone polymer or polymethylmethacrylate, and ranging in size from 2 μm to 6 μm. Migratory slip agents such as fatty amides and/or silicone oils can also be optionally employed in the film layer either with or without the inorganic antiblocking additives to aid further with controlling coefficient of friction and web handling issues. Suitable types of fatty amides are those such as stearamide or erucamide and similar types, in amounts of 100-5000 ppm of the layer. Preferably, erucamide is used at 500-1000 ppm of the layer. A suitable silicone oil that can be used is a low molecular weight oil of 350 centistokes which blooms to the surface readily at a loading of 400-600 ppm of the layer. However, if the films are desired to be used for metallizing or high definition process printing, it is recommended that the use of migratory slip additives be avoided in order to maintain metallized barrier properties and adhesion or to maintain high printing quality in terms of ink adhesion and reduced ink dot gain.

This mixed resin layer (A) of propylene-based random copolymer and LDPE is typically 50 μm to 200 μm in thickness after monoaxial orientation, preferably between 60 μm and 150 μm, and more preferably between 70 μm and 100 μm in thickness. The mixed resin layer can also be surface treated on one side with either an electrical corona-discharge treatment method, flame treatment, atmospheric plasma, or corona discharge in a controlled atmosphere of nitrogen, carbon dioxide, or a mixture thereof, with oxygen excluded and its presence minimized. The latter method of corona treatment in a controlled atmosphere of a mixture of nitrogen and carbon dioxide results in a treated surface that includes nitrogen-bearing functional groups, preferably at least 0.3 atomic % or more, and more preferably, at least 0.5 atomic % or more. The discharge-treated mixed resin layer is then well suited for subsequent purposes of laminating, coating, printing, or metallizing.

It has been surprisingly found that a film with a thicknesses below 50 µm, with a thickness of 37.5 µm or less, with a thickness of less than 37.5 µm, with a thickness of between 37.5 and 25 µm, or with a thickness of about 30 µm can be obtained with a mixed resin layer (A) of propylene-based random copolymer and LDPE comprised of or consisting essentially of or consisting of a blend of about 40-60 wt % or 45-55 wt % ethylene-propylene elastomer (such as ExxonMobil Vistamaxx™ 3890 FL); about 15-40 wt % or about 20-40 wt % non-elastomeric ethylene-propylene random copolymer or ethylene-propylene-butene random copolymer (such as Total Petrochemical 8473 or Sumitomo Chemical SPX78R1); and about 20-40 wt % or about 25-35 wt % low density polyethylene (such as ExxonMobil LD105.30). In some embodiments, a blend of about 50 wt % ethylene-propylene elastomer; about 20 wt % non-elastomeric ethylene-propylene random copolymer; and about 30 wt % low density polyethylene is used to provide a film enabling production of a nominal 30 µm heat sealable directional tear film, after mono-axial orientation in the machine direction of about 5.0 times (5.0 MDX). It was surprisingly found that films with these formulations could be made at these thinner thicknesses with no loss in productivity due to film breakage, have good film flatness profile, and appearance.

In the embodiments in which a multi-layer film such as a two-layer laminate film or a three-layer laminate film is contemplated, the mixed resin layer (A) of the previously described propylene random copolymer and LDPE can be coextruded with another layer. In the embodiment of a 2-layer laminate film structure, the mixed resin layer (A) includes a sealant layer on one side of a core layer (B). Preferably, this core layer (B) includes a polyolefin resin-containing layer which in turn, could include a propylene homopolymer or propylene copolymer. More preferable is an ethylene-propylene impact copolymer or an ethylene-propylene random copolymer of similar types used as a component of the (A)-layer such as the previously described Total 5571 isotactic ethylene-propylene impact copolymer or other copolymer grades mentioned. The (A)-layer can be the same thickness as the (B) core layer, but preferably is thinner than the (B)-layer, about 5-50% of the total thickness of the (A) and (B) layers combined, more preferably 10-30% of the total thickness of the laminate film structure (A) and (B) layers combined. This core polyolefin resin-containing layer can also include an antiblock component selected from the group consisting of amorphous silicas, aluminosilicates, sodium calcium aluminum silicates, crosslinked silicone polymers, and polymethylmethacrylates to aid in machinability and winding. Migratory slip additives such as fatty amides or silicone oils could also be added as previously described if desired. It can also be contemplated to discharge-treat the side of the core layer (B) opposite the heat sealable layer (A) in order to enhance that side for laminating via adhesives, etc. Discharge-treating can be done by any of several means well known in the art, such as corona, flame, plasma, or discharge-treatment in a controlled atmosphere of selected gases as described previously.

In the embodiment of a 3-layer laminate film structure, a third layer (C) would be disposed on the side of the core layer (B) opposite the heat sealable mixed resin layer (A) and preferably includes a polyolefin resin-containing layer which in turn, includes a polyolefin selected from the group consisting of propylene homopolymer, copolymers, terpolymers, polyethylene, or maleic anhydride-grafted polypropylene, polyethylene, or copolymers thereof, and combinations of all thereof. This third layer (C) will generally be thinner than the core layer (B) and can be a thickness ranging 2-30% of the combined thickness of the 3 layers together, preferably about 5-10% of the overall thickness of the multi-layer laminate. This third polyolefin resin-containing layer can also include an antiblock component selected from the group consisting of amorphous silicas, aluminosilicates, sodium calcium aluminum silicates, crosslinked silicone polymers, and polymethylmethacrylates to aid in machinability and winding and/or migratory slip additives such as fatty amides or silicone oils. The third polyolefin layer can also be a discharge-treated layer having a surface for lamination, metallizing, printing, or coating with adhesives or other materials.

In the above embodiments of multi-layer films, the respective layers can be coextruded through a multi-layer compositing die such as a 2- or 3-layer die, and cast onto a chill roll to form a solid film suitable for further processing. In the case of a single layer film, the respective layer can be extruded through a single-layer die and cast onto a chill roll to form a solid film suitable for further processing. Extrusion temperatures are typically set at 235-270° C. with a resulting melt temperature at the die of about 230-250° C. For the embodiments of a "thin" (less than 50 µm) heat sealable directional tear film, lower extrusion temperatures are used, ca. 204-221° C. with a resulting melt temperature at the die of about 232° C.

In all these embodiments, a key element is to monoaxially orient the film layer in the machine direction to a certain amount. It is this monoaxial orientation that imparts the directional or linear tearing properties that make it useful in pouching applications. It is the combination of this monoaxial orientation with the heat sealable resin formulation of propylene-based random copolymer and low density polyethylene that allows excellent and suitable heat seal initiation and seal strengths fit-for-use in pouch applications and excellent directional and linear tear properties. The amount of monoaxial machine direction orientation should be about 2.5-7 times in the machine direction, preferably 3-7 times, and more preferably 4.0 to 6.0 times. Suitably clean and linear tear properties are found at these monoaxial orientation rates. However, above a 7:1 machine direction orientation ratio, processability issues may result such as film breakage which can affect the product cost and machine efficiency; below a 2.5:1 machine direction orientation ratio, processability issues such as uneven film profile, gauge bands, and uneven stretch marks can occur which also can result in higher product costs and lower machine efficiencies.

Surprisingly, it is the combination of the non-elastomeric propylene random copolymer, propylene-based elastomer, LDPE, and MD orientation as described above, that provides both excellent SIT and directional tear properties. MD orientation of each of the resin components alone—i.e. the unblended non-elastomeric propylene random copolymer, elastomer, or the unblended LDPE—does not provide satisfactory directional tear. Without being bound by any theory, it is hypothesized that the incompatibility of the LDPE in the propylene-based random copolymer blend during mono-orientation aids in forming "fibrils" which improves the directional or linear tear properties. It is believed that the domains or regions of incompatible LDPE within the propylene-based copolymer matrix become oriented or ordered during mono-orientation in such a way that these "oriented domains" form zones or "fault lines" that facilitate linear tear parallel to the direction of orientation. It is noted that mono-orientation of propylene-based random copolymers or LDPE by itself did not exhibit satisfactory linear tear (although in contrast, mono-orientation of high density polyethylene (HDPE) does exhibit good linear tear properties; it is possible that the orientation of the crystalline and amorphous regions in the HDPE provide good linear tear properties).

Indeed, it is possible that any incompatible polymer to the propylene-based random copolymer could help improve linear tear properties of amorphous or low crystallinity mono-oriented polymer films. It can also be speculated that the principle could be applied to cast or blown LDPE films whereby an incompatible polymer (e.g. propylene random copolymer or homopolymer) is added as a minority component to the LDPE film, oriented in machine direction, and thus exhibit satisfactory linear tear properties as well as low seal initiation properties similar to conventional blown or cast LDPE films used as heat sealing films.

Moreover, the limited compatibility of the LDPE with the ethylene portions of the propylene random copolymer also helps maintain desirable optical clarity properties (reduced haze if transparent film is desired) and significantly lower seal initiation temperatures. With higher loadings of LDPE, the directional tear properties are seen to be generally further improved (with a fixed mono-orientation rate) as well as heat seal initiation temperature; while heat seal properties for strength and hot tack are maintained by the propylene-based random copolymers.

The inventive resin blend—whether in single layer or multi-layer embodiments—is extruded into a sheet form and cast onto a cooling drum at a speed of 6 to 15 mpm whose surface temperature is controlled between 20° C. and 60° C. to solidify the non-oriented laminate sheet. The non-oriented laminate sheet is stretched in the longitudinal direction at about 90° C. to 110° C. at a stretching ratio of about 2.5 to about 7 times the original length, and most preferably between about 4.0 and 6 times, and the resulting stretched sheet is annealed or heat-set at about 130° C. to 150° C. in the final zones of the machine direction orientation section to reduce internal stresses and minimize thermal shrinkage and to obtain a dimensionally stable uniaxially oriented laminate sheet. After orientation, the typical film thickness is 50-200 μm and most preferably, 70-100 μm. The uniaxially oriented sheet can then pass through a discharge-treatment process on one side of the film such as an electrical corona discharge treater to impart a suitable surface for lamination to other films as desired. The one-side treated film is then wound into roll form.

For the embodiments of "thin" (less than 50 μm) heat sealable directional tear films, higher casting speeds and lower temperatures are used, ca. 17 mpm and ca. 43-48° C., respectively. Machine direction stretching temperatures are also lower, about 76-82° C. at a stretching ratio of about 4.0-6.0 times; the resulting stretched sheet can be annealed or heat-set at about 88° C.

A further embodiment is to metallize the discharge-treated surface of the resin blend layer. The unmetallized laminate sheet is first wound in a roll. The roll is placed in a metallizing chamber and the metal vapor-deposited on the discharge-treated mixed resin metal receiving layer surface. The metal film may include titanium, vanadium, chromium, manganese, iron, cobalt, nickel, copper, zinc, aluminum, gold, or palladium, the preferred being aluminum. Metal oxides—as well as silicon oxides—can also be contemplated, the preferred being aluminum oxide. The metal layer can have a thickness between 5 and 100 nm, preferably between 20 and 80 nm, more preferably between 30 and 60 nm; and an optical density between 1.5 and 5.0, preferably between 2.0 and 4.0, more preferably between 2.3 and 3.2. The metallized film is then tested for oxygen and moisture gas permeability, optical density, metal adhesion, metal appearance and gloss, and can be made into an adhesive laminate structure.

An additional embodiment can be contemplated in which the inventive film formulation can be co-extruded or coated with a polymeric or organic gas barrier material upon one side of the film. Preferably, a barrier coating can be applied to the discharge-treated surface or side of the inventive film. Such barrier coatings can include, but are not limited to, polyvinyl alcohol, ethylene vinyl alcohol, polyhydroxyaminoether, polyvinylidene chloride, vinyl alcohol-vinyl amine, or blends thereof, and either crosslinked or uncrosslinked. Such coatings may also require the use of a primer layer or tie-layer either coated onto the inventive film prior to the application of the barrier layer in order to provide strong bonds between the inventive film layer and the barrier layers; or co-extruded as a skin layer with the inventive film layer or blended into the inventive film layer as an optional component. A suitable tie-layer or tie-resin for blending can include a maleic anhydride-grafted polyolefin. The barrier coatings may be applied in either off-line or in-line coating processes well known in the art. It can also be contemplated to coextrude the barrier layer using (but not limited to) extrusion-grade ethylene vinyl alcohol resin, polyvinyl alcohol resin, or polyhydroxyaminoether resin. Again, a tie-layer may be advantageously coextruded as an intermediate layer between the barrier layer and the inventive film layer to improve bonding of these polar and non-polar polymers. A preferred embodiment would be to further metallize as described previously upon the surface of the barrier layer which is opposite the side with the inventive film layer.

This invention will be better understood with reference to the following examples, which are intended to illustrate specific embodiments within the overall scope of the invention.

Example 1

A single layer monoaxially oriented film was made using a monoaxial orientation process, including a blend of about 97 wt % Total Z9421 ethylene-propylene random copolymer and about 3 wt % ExxonMobil LD 105.30 low density polyethylene with about 1 part per hundred (phr) concentration of Ampacet 40878 Skiblock™ 5 wt % synthetic silica (nominal 2.0 μm size) antiblock masterbatch in propylene homopolymer carrier resin. The resin mixture was pellet-blended, then melt-extruded through a die, cast on a chill drum, and oriented in the machine direction at a 4.8:1.0 stretch ratio, through a series of heated and differentially sped rolls. The film was heat-set or annealed in the final zones of the MD orientation section to reduce internal stresses and minimize heat shrinkage of the film and maintain a dimensionally stable monoaxially oriented film. Final film thickness after orientation was ca. 70 μm (280 G). One surface of the film (the cast roll side) is treated via discharge treatment methods such as corona or flame or other methods, after orientation, in order to provide a higher surface energy, functionalized surface for further adhesive or extrusion lamination, coating, printing, or metallizing. The opposite side (air side or non-cast roll side) of the film is left untreated in order to preserve the heat sealable properties of the film. The mono-oriented film was wound in roll form and tested for haze, heat sealability, seal initiation temperature, and directional tear.

Example 2

Example 1 was substantially repeated except that the mixed resin layer was changed to a blend of about 90 wt % Z9421 random copolymer and about 10 wt % LD105.30 LDPE. About 1 part per hundred (phr) concentration of Ampacet 40878 synthetic silica antiblock masterbatch was added.

Example 3

Example 1 was substantially repeated except that the mixed resin layer was changed to about 40 wt % Z9421 random copolymer, about 40 wt % Vistamaxx™ 3980 elastomer, and about 20 wt % LD105.30 LDPE. About 4.6 parts per hundred (phr) concentration of Ampacet 40878 synthetic silica antiblock masterbatch was added.

Example 4

Example 1 was substantially repeated except that the mixed resin layer was changed to about 80 wt % Vistamaxx™ 3980 elastomer and about 20 wt % LD105.30 LDPE. About 4.6 parts per hundred (phr) concentration of Ampacet 40878 synthetic silica antiblock masterbatch was added.

Example 5

Example 1 was substantially repeated except that the mixed resin layer was changed to about 40 wt % Vistamaxx™ 3980 elastomer, about 40 wt % Sumitomo SPX78R1 ethylene-propylene-butene copolymer, and about 20 wt % LD105.30 LDPE. About 2 parts per hundred (phr) concentration of Ampacet 40878 synthetic silica antiblock masterbatch was added.

Example 6

Example 1 was substantially repeated except that the mixed resin layer was changed to about 45 wt % Vistamaxx™ 3980 elastomer, about 30 wt % Sumitomo SPX78R1 ethylene-propylene-butene copolymer, and about 25 wt % LD105.30 LDPE. About 2 parts per hundred (phr) concentration of Ampacet 40878 synthetic silica antiblock masterbatch was added.

Example 7

Example 1 was substantially repeated except that the mixed resin layer was changed to about 35 wt % Vistamaxx™ 3980 elastomer and about 65 wt % LD105.30 LDPE. About 4 parts per hundred (phr) concentration of Ampacet 40878 synthetic silica antiblock masterbatch was added.

Example 8

A single layer mono-axially oriented film was made using a mono-axial orientation process, comprised of a blend of about 20 wt % Total 8473 ethylene-propylene random copolymer, about 50 wt % ExxonMobil Vistamaxx™ ethylene-propylene elastomer, and about 30 wt % ExxonMobil LD 105.30 low density polyethylene with about 1.5 part per hundred (phr) concentration of Primary Colors, Inc. 1P154 5 wt % erucamide slip masterbatch in propylene homopolymer carrier resin. The resin mixture was pellet-blended, then melt-extruded through a die, cast on a chill drum, and oriented in the machine direction at a 5.0:1.0 stretch ratio, through a series of heated and differentially sped rolls. The film was heat-set or annealed in the final zones of the MD orientation section to reduce internal stresses and minimize heat shrinkage of the film and maintain a dimensionally stable mono-axially oriented film. Final film thickness after orientation was ca. 30 µm (120 G or 1.20 mil). One surface of the film (the cast roll side) is treated via discharge treatment methods such as corona or flame or other methods, after orientation, in order to provide a higher surface energy, functionalized surface for further adhesive or extrusion lamination, coating, printing, or metallizing. The opposite side (air side or non-cast roll side) of the film is left untreated in order to preserve the heat sealable properties of the film. The mono-oriented film was wound in roll form and tested for haze, heat sealability, seal initiation temperature, and directional tear.

Example 9

Example 8 was substantially repeated except that the mixed resin layer was changed to a blend of about 40 wt % Sumitomo SPX78R1 ethylene-propylene-butene random copolymer, about 40 wt % ExxonMobil Vistamaxx™ ethylene-propylene elastomer, and about 20 wt % ExxonMobil LD 105.30 low density polyethylene with about 1.5 part per hundred (phr) concentration of Primary Colors, Inc. 1P154 5 wt % erucamide slip masterbatch in propylene homopolymer carrier resin. Note that this Example 9 is substantially the same polymer blend formulation as Example 5 except that the final mono-axial oriented film thickness is nominal 30 µm instead of nominal 70 µm.

Example 10

Example 8 was substantially repeated except that the mixed resin layer was changed to a blend of about 60 wt % ExxonMobil Vistamaxx™ ethylene-propylene elastomer, and about 40 wt % ExxonMobil LD 105.30 low density polyethylene with about 1.5 part per hundred (phr) concentration of Primary Colors, Inc. 1P154 5 wt % erucamide slip masterbatch in propylene homopolymer carrier resin.

Comparative Example 1

Example 1 was substantially repeated except that the mixed resin layer was changed to 100 wt % Z9421 ethylene-propylene random copolymer. No Ampacet 40878 synthetic silica antiblock masterbatch was added.

Comparative Example 2

Example 1 was substantially repeated except that the mixed resin layer was changed to about 85 wt % Z9421 random copolymer and about 15 wt % high crystalline propylene homopolymer (Total Petrochemical 3270, melt flow rate 2.0 g/10 min at 230° C., 165° C. melting point, 0.91 g/cm$^3$ density). About 1 part per hundred (phr) concentration of Ampacet 40878 synthetic silica antiblock masterbatch was added.

Comparative Example 3

Example 1 was substantially repeated except that the mixed resin layer was changed to about 70 wt % Z9421 random copolymer and about 30 wt % high crystalline propylene homopolymer (Total Petrochemical 3270, melt flow rate 2.0 g/10 min at 230° C., 165° C. melting point, 0.91 g/cm$^3$ density). About 1 part per hundred (phr) concentration of Ampacet 40878 synthetic silica antiblock masterbatch was added.

Comparative Example 4

Example 1 was substantially repeated except that the mixed resin layer was changed to about 90 wt % Z9421 random copolymer and about 10 wt % cyclic olefin copolymer (Topas TO 9506F-04cyclic olefin copolymer (COC) resin, 5.5 g/10 min MFR at 230° C., density 1.02 g/cm$^3$, and a glass transition temperature of 65° C.). About 1 part per hundred (phr) concentration of Ampacet 40878 synthetic silica antiblock masterbatch was added.

The formulations and unlaminated properties of the Examples and Comparative Examples ("CEx.") are shown in Tables 1 and 2 respectively.

Comparative Example 5

Example 8 was substantially repeated except that the mixed resin layer was changed to a blend of about 40 wt % ExxonMobil Vistamaxx™ ethylene-propylene elastomer and about 60 wt % ExxonMobil LD 105.30 low density polyethylene with about 1.5 part per hundred (phr) concentration of Primary Colors, Inc. 1P154 5 wt % erucamide slip masterbatch in propylene homopolymer carrier resin.

Comparative Example 6

Example 8 was substantially repeated except that the mixed resin layer was changed to a blend of about 97 wt % Total Z9421 ethylene-propylene random copolymer and about 3 wt % ExxonMobil LD 105.30 low density polyethylene with about 1.5 part per hundred (phr) concentration of Primary Colors, Inc. 1P154 5 wt % erucamide slip masterbatch in propylene homopolymer carrier resin. Note that this Comparative Example 6 is substantially the same polymer blend formulation as Example 1 except that the final mono-axial oriented film thickness is nominal 30 μm instead of nominal 70 μm.

Comparative Example 7

Example 8 was substantially repeated except that the mixed resin layer was changed to a blend of about 40 wt % Total Z9421 ethylene-propylene random copolymer, about 40 wt % ExxonMobil 3980 FL ethylene-propylene elastomer, and about 20 wt % ExxonMobil LD 105.30 low density polyethylene with about 1.5 part per hundred (phr) concentration of Primary Colors, Inc. 1P154 5 wt % erucamide slip masterbatch in propylene homopolymer carrier resin. Note that this Comparative Example 7 is substantially the same polymer blend formulation as Example 3 except that the final mono-axial oriented film thickness is nominal 30 μm instead of nominal 70 μm.

The formulations and unlaminated properties of the Examples ("Ex.") 1-7 and Comparative Examples ("CEx.") 1-4 are shown in Tables 1 and 2, respectively. The formulations and unlaminated properties of Examples ("Ex.") 8-10 and Comparative Examples ("CEx.") 5-7 are shown in Tables 3 and 4, respectively.

TABLE 1

| Composition (wt % except as noted) | CEx1 | CEx 2 | CEx 3 | CEx 4 | Ex 1 | Ex 2 | Ex 3 | Ex 4 | Ex 5 | Ex 6 | Ex 7 |
|---|---|---|---|---|---|---|---|---|---|---|---|
| Total Z9421 | 100 | 85 | 70 | 90 | 97 | 90 | 40 | 0 | 0 | 0 | 0 |
| ExxonMobil 3980 FL | 0 | 0 | 0 | 0 | 0 | 0 | 40 | 80 | 40 | 45 | 35 |
| Sumitomo SPX78R1 | 0 | 0 | 0 | 0 | 0 | 0 | 0 | 0 | 40 | 30 | 0 |
| Total 3270 | 0 | 15 | 30 | 0 | 0 | 0 | 0 | 0 | 0 | 0 | 0 |
| ExxonMobil LD105.30 | 0 | 0 | 0 | 0 | 3 | 10 | 20 | 20 | 20 | 25 | 65 |
| Topas TO9506F-04 | 0 | 0 | 0 | 10 | 0 | 0 | 0 | 0 | 0 | 0 | 0 |
| Ampacet 40878 (phr) | 0 | 1 | 1 | 1 | 1 | 1 | 4.6 | 4.6 | 2 | 2 | 4 |

TABLE 2

| Sample | Tear Rating (1 = good; 4 = poor) | Haze % | Seal Initiation Temperature (SIT) (° F.) (° C.) | Heat Seal Strength @ 290° F. lbf/in | Heat Seal Strength @ 143.3° C. N/25 mm |
|---|---|---|---|---|---|
| CEx. 1 | 3 | 7.2 | 285 (140.6) | 2.46 | 10.94 |
| CEx. 2 | 3 | 15.9 | 330 (165.6) | N/A* | N/A* |
| CEx. 3 | 2 | 10.5 | 335 (168.3) | N/A* | N/A* |
| CEx. 4 | 4 | 10.1 | 285 (140.6) | 4.64 | 20.64 |
| Ex. 1 | 2 | 6.95 | 285 (140.6) | 8.02 | 35.67 |
| Ex. 2 | 1 | 6.6 | 280 (137.8) | 9.03 | 40.17 |
| Ex. 3 | 1 | 19.1 | 265 (129.4) | 2.09 | 9.30 |
| Ex. 4 | 4 | 59.7 | 230 (110.0) | 7.49 | 33.32 |
| Ex. 5 | 1 | 30.3 | 230 (110.0) | 5.68 | 25.27 |
| Ex. 6 | 1 | 39.4 | 250 (121.1) | 3.59 | 15.97 |
| Ex. 7 | 1 | 43.2 | 250 (121.1) | 4.80 | 21.35 |

*These examples did not record a value due to SIT being greater than 290° F. (143.3° C.)

As Table 1 showed, Comparative Example 1 (CEx 1) was a film including about 100 wt % Total Z9421 ethylene-propylene random copolymer. Table 2 shows test data for this composition having good haze of 7.2%. Any value less than 30 percent would be good for a clear packaging application, with up to 60 percent being acceptable for translucent applications. This film also showed an acceptable SIT and marginal heat seal strength of 2.46 lb/in (10.94 N/25 mm) at 290° F. (143.3° C.). However, when a film sheet was torn by hand at a notch along the machine direction, the appearance of the tear initiation point showed a qualitative 3 rating with stress-whitening and deformation and the torn edge was found to be irregular and often zippered down the face of the package in the transverse direction. A tear property rating of 1 or 2 is desirable, which indicates good directional tear properties and no or little zippering or non-uniform tear. CEx 1's directional tear was considered to be poor or marginal at best.

Comparative Example 2 (CEx 2) showed a film formulation that used 85 wt % Total Z9421 random copolymer and 15 wt % Total 3270 high crystalline propylene homopolymer and which incorporated the Ampacet antiblock. In this example, the SIT was significantly higher than that of CEx 1 due to the addition of crystalline propylene homopolymer. Haze remained comparable at 15.9. However, the directional tear was still poor. Although the film could be rapidly torn with a fairly straight-edge and parallel to the machine direction of the sheet, if the tear was interrupted it could be torn at an angle. The addition of the crystalline homopolymer was to improve directional tear properties after orientation; compared to CEx. 1, directional tear was improved, though not enough.

Comparative Example 3 (CEx. 3) showed a film formulation that uses 70 wt % Total Z9421 random copolymer and 30 wt % Total 3270 high crystalline propylene homopolymer and which incorporated the Ampacet antiblock. In this example, the SIT was significantly higher than that of CEx. 1 and slightly higher than that of CEx. 2 due to the increased amount of crystalline propylene homopolymer. Haze remained very comparable. However, directional tear was improved and was considered acceptable, though SIT was undesirably higher at 335° F. (168.3° C.).

Comparative Example 4 (CEx 4) showed a film that used 90 wt % Total Z9421 random copolymer and 10 wt % cyclic olefin copolymer (COC) and which incorporated the Ampacet antiblock. No linear tear properties were observed with this formulation, though seal strength and SIT were acceptable.

Example 1 (Ex. 1) is a film that used about 97 wt % Total Z9421 ethylene-propylene random copolymer and about 3 wt % LDPE and which incorporated an amount of the Ampacet silica antiblock. This film showed an acceptable improvement in the tear properties from those of CEx. 1, 2 and 4 in addition to significantly improved heat seal strength and an acceptable SIT.

Example 2 (Ex. 2) showed a film that used 90 wt % Total Z9421 random copolymer and 10 wt % LDPE and which incorporated the Ampacet antiblock. It had excellent tear properties with no loss of heat seal strength or SIT properties. The additional LDPE also improved the bonds to LDPE based zipper stock, which is added to many packages to make them resealable. Directional tear was extremely good, with the tear propagating cleanly from the notch with no stress-whitening of deformations. The tear itself was very straight edged and parallel to the machine direction of the sheet.

Example 3 (Ex. 3) showed a film that used 40 wt % Total Z9421 random copolymer, 40 wt % Vistamaxx 1980 elastomer, and 20 wt % LDPE and which incorporated the Ampacet antiblock. This blend was designed to heat seal at a lower temperature than the prior examples. The LDPE percentage was increased for even better heat seal bonds to the LDPE zipper stock. This 20 wt % of LDPE formed acceptable 7 lb/in seals (31.14 N/25 mm) to the zipper stock. Tear properties were excellent. The haze was a bit higher and the seal strength was lower than that of prior examples.

Example 4 (Ex. 4) showed a film that used 80 wt % Vistamaxx 3980 elastomer, and 20 wt % LDPE and which incorporated the Ampacet antiblock. This film did not incorporate enough LPDE to render linear tear properties to the film. The Vistamaxx was rather rubbery and overwhelmed the 20 wt % LDPE part of the blend.

Example 5 (Ex. 5) showed a film that used 40 wt % Vistamaxx 3980 elastomer, 40 wt % Sumitomo SPX78R random copolymer, and 20 wt % LDPE and which incorporated the Ampacet antiblock. It was fairly similar to Example 3, having excellent tear properties and also a lower SIT than prior examples. The heat seal strength at 290° F. (143.3° C.) was higher than that of Example 3, but not as high as that of Examples 1, 2, and 4.

Example 6 (Ex. 6) showed a film that used 45 wt % Vistamaxx 3980 elastomer, 30 wt % Sumitomo SPX78R random copolymer, and 25 wt % LDPE and which incorporated Ampacet antiblock. This was a variation of Example 5 and showed high haze but other properties were similar, including excellent tear properties.

Example 7 (Ex. 7) showed a film that was 35 wt % Vistamaxx 3980 elastomer and 65 wt % LDPE with Ampacet antiblock master batch. The haze was fairly high. It showed excellent tear properties, good heat seal strength, and a low SIT due to the low melting point of the component and the increased thickness of the film. This example's results indicates that it is possible that the minority component of propylene-based elastomer provided the incompatible "fibrils" for linear tear properties in the LDPE majority component.

Thus, the foregoing Examples show a way to maintain high seal strengths, low seal initiation temperatures, and yet provide the desirable attribute of directional tear that is imparted from orientation stretching of the film. Since it is expected that seal performance will be worsened after orientation of the film, our invention unexpectedly has shown excellent seal performance with orientation of the film.

TABLE 3

| Composition (wt % except as noted) | CEx 5 | CEx 6 | CEx 7 | Ex 8 | Ex 9 | Ex 10 |
| --- | --- | --- | --- | --- | --- | --- |
| Total Z9421 | 0 | 97 | 40 | 0 | 0 | 0 |
| Total 8473 | 0 | 0 | 0 | 20 | 0 | 0 |
| ExxonMobil 3980 FL | 40 | 0 | 40 | 50 | 40 | 60 |
| Sumitomo SPX78R1 | 0 | 0 | 0 | 0 | 40 | 0 |
| ExxonMobil LD105.30 | 60 | 3 | 20 | 30 | 20 | 40 |
| Primary Color 1P154 (phr) | 1.5 | 1.5 | 1.5 | 1.5 | 1.5 | 1.5 |

TABLE 4

| Sample | Tear Rating (1 = good; 4 = poor) | Haze % | Seal Initiation Temperature (SIT) ° F. (° C.) | Heat Seal Strength @ 290° F. lbf/in | Heat Seal Strength @ 143.3° C. N/25 mm | Film-Making Stability |
|---|---|---|---|---|---|---|
| CEx. 5 | NA* | NA* | NA* | NA* | NA* | Poor |
| CEx. 6 | NA* | NA* | NA* | N/A* | N/A* | Poor |
| CEx. 7 | 1 | 31 | 272 (133.5) | 2.29 | 10.18 | Marginal |
| Ex. 8 | 1 | 29 | 257 (125.0) | 5.47 | 24.33 | Excellent |
| Ex. 9 | 1 | 37 | 268 (131.1) | 2.32 | 10.27 | Marginal |
| Ex. 10 | 2 | 41 | 236 (113.6) | 5.94 | 26.42 | Marginal |

*No values could be measured due to no film made

As Tables 3 and 4 showed, Comparative Example 5 (CEx. 5) was a mono-axially oriented film formulated with about 40 wt % ExxonMobil 3980 FL ethylene-propylene copolymer elastomer and about 60 wt % ExxonMobil LD105.30 low density polyethylene with some slip additive. (No higher molecular weight non-elastomeric ethylene-propylene random co- or terpolymer was used in this example.) CEx. 5 was mono-oriented at a nominal MDX of 5.0 to make a nominal 30 μm thick film after orientation. However, film-making stability for this Comparative Example was very poor at this thickness and no film could be made.

Comparative Example 6 (CEx. 6) was similar in formulation as Ex. 1 but was attempted to be made at a lower thickness of nominal 30 μm (vs. 70 μm in Ex. 1). At this thinner thickness of 30 μm, film stability was very poor and no film could be made.

Comparative Example 7 (CEx. 7) was similar in formulation as Ex. 3 but was made at a lower thickness of nominal 30 μm (vs. 70 μm in Ex. 3). At this thinner thickness of 30 μm, film stability was marginal with several film breakages but some film was able to be made for testing. CEx. 7 demonstrated very good linear tear properties, but its SIT was comparatively higher and its heat seal strength was comparatively lower than its peer Examples in Table 4.

Example 8 (Ex. 8) was a formulation of about 50 wt % ExxonMobil 3980FL elastomer, about 20 wt % Total 8473 ethylene-propylene copolymer, about 30 wt % low density polyethylene, and a small amount of slip additive. This Example was mono-axially oriented at about 5.0 MDX to achieve a film thickness of nominal 30 μm after orientation. Film-making stability was surprisingly excellent with high productivity and yield. Linear tear properties were very good; SIT was also good and heat seal strength values were good, particularly in comparison to its peer examples in Table 4. This particular Ex. 8 suprisingly and unexpectedly demonstrated the best film-making stability and productivity at film thickness ranges of less than 50 μm than its peer Examples and Comparative Examples.

Example 9 (Ex. 9) was a formulation using a blend of about 40 wt % ExxonMobil 3980FL ethylene-propylene copolymer elastomer, about 40 wt % Sumitomo SPX78R1 ethylene-propylene-butene terpolymer, and about 20 wt % low density polyethylene with a small amount of slip additive. This Example was mono-axially oriented at nominal 5.0 MDX to achieve a final film thickness of nominal 30 μm. Film-making stability was marginal with several film breakages occurring; however, some film was able to be made for testing. Ex. 9 is somewhat similar in formulation and performance as CEx. 7 was, differing in the type of higher molecular weight copolymer used. As such, Ex. 9's linear tear property was very good; SIT and heat seal strength was similar, though slightly better than CEx. 7.

Example 10 (Ex. 10) was similar in formulation to CEx. 5 except that the amount of ethylene-propylene elastomer ExxonMobil 3980FL was increased from about 40 wt % to about 60 wt %; and the amount of low density polyethylene was decreased from about 60 wt % to about 40 wt %. "Thin" (i.e. less than 50 μm, nom. 30 μm) film-making capability was better than that of CEx. 5, but was still deemed marginal with several film breakages occurring. However, some film was able to be made for testing: Ex. 10's linear tear was acceptable, with excellent SIT performance and good heat seal strengths.

Thus, the foregoing Examples demonstrate formulations to produce "thin" heat sealable directional tear films that are less than nominal 50 μm thickness compared to other heat sealable directional tear film formulations that are typically difficult to make below nominal 50 μm thickness (and more suitable for about 70 μm thicknesses). Unexpectedly, such formulations significantly improve film-making processability and productivity, minimizing film breakage, and yet maintaining the desired high seal strengths, low seal initiation temperatures, and the desirable attribute of directional tear that is imparted from mono-orientation stretching of the film.

Test Methods

The various properties in the above examples were measured by the following methods:

Heat seal strength: Measured by using a Sentinel sealer model 12 ASL at 25 psi, 1.0 second dwell time, with heated flat upper seal jaw Teflon coated, and unheated lower seal jaw, rubber with glass cloth covered. The film sample is heat-sealed to itself at the desired seal temperature(s) in the Sentinel sealer (e.g. 310° F.). To prevent the film from sticking to the sealer's jaws, the test film can be laid onto a heat-resistant film such as a biaxially oriented nylon or polyethylene terephthalate film (PET). These two films are then folded over such that the nylon or PET film is outermost and in contact with the heated sealer jaws; the test film is then the inner layer and will seal to itself upon application of heat and pressure. A 15-20 um thick nylon or PET film is recommended; if too thick, this may interfere with thermal transfer to the test film. The test film should be inserted between the heat sealer's jaws such that the film's machine direction is perpendicular to the heat sealer jaws. Heat seal temperatures may be increased at desired intervals, e.g. 10° F. increments. The respective seal strengths are measured using an Instron model 4201 tensile tester. The heat-sealed film samples are cut into 1-inch wide strips along the machine direction; the two unsealed tails placed in the upper and lower Instron clamps, and the sealed tail supported at a 90° angle to the two unsealed tails for a 90° T-peel test. The peak and average seal strength is recorded. The preferred value is about 3 lb$_f$/in (13.35 N/25 mm) at 290° F. (143.3° C.) seal temperature.

Seal initiation temperature: Heat seal initiation temperature (SIT) was measured by using a Sentinel sealer model 12 ASL at 25 psi, 1.0 second dwell time, with heated flat upper seal jaw Teflon coated, and unheated lower seal jaw, rubber with glass-cloth covered. The film sample is heat-sealed to itself at various desired seal temperatures in the Sentinel sealer and then the respective seal strengths are measured using an Instron model 4201 tensile tester as discussed above for heat seal strength determination. The Seal Initiation Temperature is defined as the seal temperature at which the film demonstrated a minimum of 1 lb$_f$/in (4.45 N/15 mm) heat seal strength. The preferred SIT value is 290° F. (143.3° C.) or lower.

Transparency of the film was measured by measuring haze of a single sheet of film substantially in accordance with ASTM D1003. Preferred haze value is 40% or less, though 60% haze or less can be acceptable for some applications.

Directional tear is tested qualitatively by notching a piece of test film on the edge and tearing by hand at the notch to initiate the tear. The notch is made parallel to the machine direction and the tear will be propagated along the machine direction. The tear is initiated from the notch by hand and observation made as to whether any stress-whitening or deformation occurs. As the tear is propagated, the consistency of the torn edges and the angle at which the tear propagates is observed. The preferred observation for good directional tear property is: 1) no stress-whitening or deformation; 2) torn edges are consistent and propagate cleanly; 3) the tear propagates in a straight line from the notch across the width of the sheet parallel to the machine direction; 4) tear would restart easily and propogate cleanly if interrupted. If the tear initiation at the notch shows stress-whitening or deformation; and/or the tear propogation is ragged, or is non-linear or non-parallel to the machine direction of the film, is propogated at an angle to the machine direction edge of the film; then this in considered to be unacceptable for directional or linear tear properties. Tear quality was rated qualitatively as follows:

1=Excellent linear tear property
2=Acceptable linear tear property
3=Marginal linear tear property
4=No linear tear property Wetting tension of the surfaces of interest was measured substantially in accordance with ASTM D2578-67. In general, the preferred value was an average value equal to or more than 40 dyne/cm with a minimum of 38 dyne/cm.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

In the embodiment of a 2-layer laminate film structure, the (A)-layer could include a sealant layer on one side of a core layer (B). Preferably, this core layer (B) includes a polyolefin resin-containing layer which in turn, includes a propylene homopolymer or propylene copolymer. More preferable is an ethylene-propylene impact copolymer. The (A)-layer can be the same thickness as the (B) core layer, but preferably is thinner than the (B)-layer, about 5-50% of the total thickness of the (A) and (B) layers combined, more preferably 10-30% of the total thickness of the laminate film structure (A) and (B) layers combined. This core polyolefin resin-containing layer can also include an antiblock component selected from the group consisting of amorphous silicas, aluminosilicates, sodium calcium aluminum silicates, glass microspheres, talcs, micas, minerals, crosslinked silicone polymers, and polymethylmethacrylates to aid in machinability and winding. It can also be contemplated to discharge-treat the side of the core layer (B) opposite the heat sealable layer (A) in order to enhance that side for laminating via adhesives, etc. Discharge-treating can be done by any of several means well known in the art, such as corona, flame, plasma, or discharge-treatment in a controlled atmosphere of selected gases.

In the embodiment of a 3-layer laminate film structure, a third layer (C) could be disposed on the side of the core layer (B) opposite the heat sealable layer (A) and preferably includes a polyolefin resin-containing layer which in turn, includes a polyolefin selected from the group consisting of propylene homopolymer, copolymers, terpolymers, polyethylene, maleic anhydride-grafted polyolefins, and combinations thereof. This third polyolefin resin-containing layer can also include an antiblock component selected from the group consisting of amorphous silicas, aluminosilicates, sodium calcium aluminum silicates, glass microspheres, talcs, micas, minerals, crosslinked silicone polymers, and polymethylmethacrylates to aid in machinability and winding. The third polyolefin layer can also be a discharge-treated layer having a surface for lamination, metallizing, printing, or coating with adhesives or inks as described previously.

In the case of a film structure including only one layer, such as the heat sealable layer (A), as mentioned previously, it can be contemplated to discharge-treat one side of this layer for lamination, metallizing, printing, or coating, while leaving the opposite side untreated in order to maintain heat sealable properties. Discharge-treating this layer can result in the treated side having a narrower seal range due to crosslinking of the ethylene and/or butene constituents of the blend. Thus, at least one side should be left untreated in order to obtain the full and useful heat seal range. In the case of a 2-layer (or more) laminate structure wherein the sealable layer (A) is contiguous with a polyolefin core layer (B), it is preferable to discharge-treat the side of the core layer opposite the sealable layer (A) for purposes of laminating, printing, metallizing, coating, etc.

Discharge-treatment in the above embodiments can be accomplished by several means, including but not limited to corona, flame, plasma, or corona in a controlled atmosphere of selected gases. Preferably, in one variation, the discharge-treated surface has a corona discharge-treated surface formed in an atmosphere of $CO_2$ and $N_2$ to the exclusion of $O_2$. The laminate film embodiments could further include a vacuum-deposited metal layer on the discharge-treated layer's surface. Preferably, the metal layer has a thickness of about 5 to 100 nm, has an optical density of about 1.5 to 5.0, and includes aluminum. In one variation, the laminate film is an extruded laminate film.

In yet another embodiment, this invention provides monoaxially oriented polyolefin films with a heat sealable layer of blends of propylene random copolymers, elastomers, and plastomers with low density polyethylene to enhance heat sealing properties for flexible packaging purposes. An additional embodiment provides laminate structures of the heat sealable polyolefin blend layers for heat sealable applications in flexible packaging.

Preferably, the monoaxially oriented film is produced via extrusion of the heat sealable layer blend through a die whereupon the molten film layer is quenched upon a chilled casting roll system or casting roll and water bath system and subsequently oriented in the machine direction and annealed or heat-set to minimize thermal shrinkage into a thermally, dimensionally stable film.

In the embodiments of a multi-layer film, the laminate film is produced via coextrusion of the heat sealable layer blend and the core layer and/or other layers through a compositing die whereupon the molten multilayer film structure is quenched upon a chilled casting roll system or casting roll and water bath system and subsequently oriented in the machine direction and annealed or heat-set into a multi-layer film.

All these examples can also be metallized via vapor-deposition, preferably a vapor-deposited aluminum layer, with an optical density of at least about 1.5, preferably with an optical density of about 2.0 to 4.0, and even more preferably between 2.3 and 3.2. In the embodiments in which the invention is part of a multi-layer coextruded film, the metal receiving layer or surface may be specially formulated or discharge-treated to enhance metal deposition, metal nucleation, and metal adhesion properties.

This invention provides a method to improve the heat sealability of monoaxially oriented films resulting in an economical, highly sealable film with excellent directional tear properties suitable for packaging applications. The invention helps solve the problems associated with the prior art of directional tear polyolefin substrates in packaging applications.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed as new and desired to be protected by Letters Patent of the United States is:

1. A monoaxially oriented polyolefin heat-set film comprising:
    40-60 wt % ethylene-propylene copolymer elastomer;
    20-40 wt % non-elastomeric propylene-based copolymer; and
    20-40 wt % low density ethylene homopolymer,
    wherein the film is monoaxially at least 2.5 times in one direction, exhibits excellent linear directional tear characteristics in a direction parallel to the orientation direction, and is less than 50 μm in thickness after orientation.

2. The film of claim 1, wherein the film is heat sealable.

3. The film of claim 1, comprising about 50 wt % ethylene-propylene copolymer elastomer, about 20 wt % non-elastomeric propylene-based copolymer, and about 30 wt % low density ethylene homopolymer.

4. The film of claim 1, wherein the thickness of the film after orientation is 25 μm-37.5 μm.

5. The film of claim 1, wherein the film is monoaxially oriented 4.0-6.0 times.

6. The film of claim 1, wherein the film is a single layer film.

7. The film of claim 1, further comprising a slip additive.

8. The film of claim 1, further comprising an antiblock component selected from the group consisting of amorphous silicas, aluminosilicates, sodium calcium aluminum silicates, glass microspheres, talcs, micas, minerals, crosslinked silicone polymers, and polymethylmethacrylates.

9. The film of claim 1, wherein a side of the film is discharge treated.

10. The film of claim 9, further comprising a metal layer on the discharge treated side of the film.

11. The film of claim 9, further comprising an adhesive or extrusion laminated layer, a coated layer, or a printed layer on the discharge treated side of the film.

12. A method of making a monoaxially oriented heat-set film that exhibits excellent linear directional tear characteristics in a direction parallel to an orientation direction comprising:
    extruding a film comprising 40-60 wt % ethylene-propylene copolymer elastomer, 20-40 wt % non-elastomeric propylene-based copolymer, and 20-40 wt % low density ethylene homopolymer; and
    monoaxially the film at least 2.5 times in one direction, wherein the film is less than 50 μm in thickness after orientation.

13. The method of claim 12, wherein the film is heat sealable.

14. The method of claim 12, wherein the film comprises about 50 wt % ethylene-propylene copolymer elastomer, about 20 wt % non-elastomeric propylene-based copolymer, and about 30 wt % low density ethylene homopolymer.

15. The method of claim 12, wherein the thickness of the film after orientation is 25 μm-37.5 μm.

16. The method of claim 12, wherein the film is monoaxially oriented 4.0-6.0 times.

17. The method of claim 12, wherein the film is a single layer film.

18. The method of claim 12, wherein the film further comprises a slip additive.

19. The method of claim 12, wherein the film further comprises an antiblock component selected from the group consisting of amorphous silicas, aluminosilicates, sodium calcium aluminum silicates, glass microspheres, talcs, micas, minerals, crosslinked silicone polymers, and polymethylmethacrylates.

20. The method of claim 12, further comprising discharge treating a side of the film.

21. The method of claim 20, further comprising vapor depositing a metal layer on the discharge treated side of the film.

22. The method of claim 20, further comprising applying an adhesive or extrusion laminated layer, a coated layer, or a printed layer on the discharge treated side of the film.

* * * * *